(12) United States Patent
Ritter

(10) Patent No.: US 6,520,539 B1
(45) Date of Patent: Feb. 18, 2003

(54) GAS BAG

(75) Inventor: Philipp Ritter, Wallertheim (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/565,337

(22) Filed: May 5, 2000

(30) Foreign Application Priority Data

May 7, 1999 (DE) ..................................... 299 08 210 U

(51) Int. Cl.⁷ ............................................. B60R 21/16
(52) U.S. Cl. .................................................. 280/743.1
(58) Field of Search ........................ 280/743.1, 743.2, 280/728.1

(56) References Cited

U.S. PATENT DOCUMENTS

| | | | | |
|---|---|---|---|---|
| 5,114,180 A | * | 5/1992 | Kami et al. | 280/743.1 |
| 5,560,649 A | * | 10/1996 | Saderholm et al. | 280/743.1 |
| 5,630,620 A | * | 5/1997 | Hirai et al. | 280/743.1 |
| 5,909,895 A | * | 6/1999 | Iino et al. | 280/743.1 |
| 6,220,629 B1 | * | 4/2001 | Wipasuramonton et al. | 280/728.1 |

FOREIGN PATENT DOCUMENTS

| | | |
|---|---|---|
| DE | 3127910 | 1/1983 |
| DE | 4111059 | 10/1991 |
| DE | 4028637 | 3/1992 |
| DE | 3943133 | 12/1992 |
| DE | 4229563 | 3/1994 |
| JP | 403010946 A | * 1/1991 ............... 280/743.1 |

OTHER PUBLICATIONS

Research Disclosure , Sep. 1996 (pp. 558, 559).

Lang, W.: Simulation Schwerer Auffahrunfälle mit Einer elektro-hydraulischen Katapultanlage Atz 72 (1970) 5 (pp. 162–167).

Laurick, Wolfagang, Werner, Helmut: Prüfung und Berwertung von Sicherheitsgurten Durch Umfallsimulation mit einem Horizontalschlitten. Atz 87, 1985 (pp. 109–118).

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A gas bag for occupant protection in vehicles is provided in which the outflow of gases at the seams is largely prevented. At least one strip of sealing material extends along the seam. The sealing effect which exists by means of the sealing material strip prevents the gas from escaping in the areas of the seam holes, because these are closed by the sealing material.

11 Claims, 1 Drawing Sheet

GAS BAG

The invention relates to a gas bag for protecting occupants in motor vehicles.

BACKGROUND OF THE INVENTION

In the current gas bag designs, several flat pieces of fabric are connected with each other by one seam or several seams. During the unfolding process, the seams are exposed to a high tensile stress. Through this tensile stress, the seam holes which are pierced into the fabric pieces are widened. At the widened seam holes, hot filling gases escape, which result in a thermal stressing of the fabric pieces and of the sewing thread. Pressure losses owing to the outflow of gases through the widened seam holes must be compensated by corresponding dimensioning of the gas generator. These shortcomings of conventional gas bag designs were accepted hitherto, because seam connections are suitable for ensuring, with a low technical expenditure, reproducible characteristics over a large temperature range of −400° C. to +105° C. and over a period of up to 15 years. Also the recycling characteristics of the conventional gas bag designs are favorable.

BRIEF SUMMARY OF THE INVENTION

The present invention provides a gas bag for occupant protection in vehicles, in which with a small additional expenditure the outflow of gases at the seams is largely prevented. According to the invention, along the seam at least one strip of sealing material is arranged, sealing the seam. The sealing effect which exists by means of the sealing material strip prevents gas from escaping in particular in the areas of the seam holes, because these are closed by the sealing material. The substance which is used as a sealing material must be sufficiently heat-resistant and in addition flexible, so as not to impair the folding- and unfolding characteristics of the gas bag. In advantageous embodiments, the sealing material is a substance based on synthetic polymer or silicate. The sealing material strip can be provided as a gas-tight band which is bonded to at least one of the fabric pieces. In the preferred embodiment, however, the sealing material strip is formed from a liquid or pasty material which is preferably applied onto the fabric pieces by a printing method. The application of the substance by means of offset printing is particularly expedient, in which the liquid or pasty substance is scraped on using a screen structured in correspondence to the shape of the seam.

BRIEF DESCRIPTION OF THE DRAWINGS

Further features and advantages of the invention will be apparent from the following description and from the drawing, to which reference is made. In the drawing.

DETAILED DESCRIPTION OF THE PREFERRED EMBODIMENTS

Figure 1:
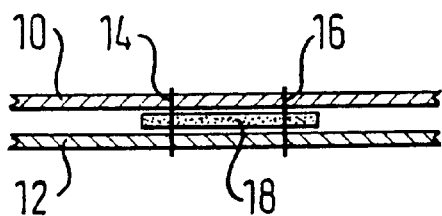
FIG. 1 shows diagrammatically a section through the wall of a gas bag in the area of two fabric pieces lying one over the other and connected with each other by a seam.

FIG. 1 shows two fabric pieces 10, 12 lying one over the other, which are connected with each other by a seam connection. The seam connection consists of two parallel seams 14, 16 which are arranged adjacent to each other at a spacing of a few millimeters. Between the fabric pieces 10, 12 a sealing material strip 18 is arranged. This strip 18 consists of a substance which also ensures under high thermal stress a sealing of the seam in particular in the areas of the seam holes. The substance from which the strip 18 is formed must, moreover, result in a high flexibility or a low rigidity of the material strip. A substance based on polymer or silicate is well suited. This substance can be applied in liquid or pasty state on at least one of the two fabric pieces 10, 12.

In the embodiment shown in FIG. 1, the sealing material strip 18 fills the space between the seams 14, 16 and extends laterally beyond them.

Figure 2:
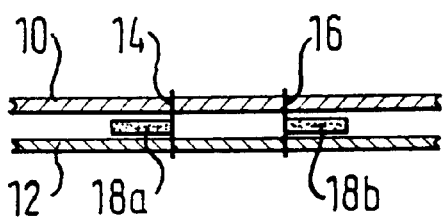
FIG. 2 shows a sectional view analogous to FIG. 1, however with a different embodiment.

In the embodiment shown in FIG. 2, the space between the seams 14, 16 remains free. In each case a material strip 18a, 18b is arranged between the fabric pieces 10, 12, adjacent to a seam 14, 16 on the exterior thereof.

Figure 3:
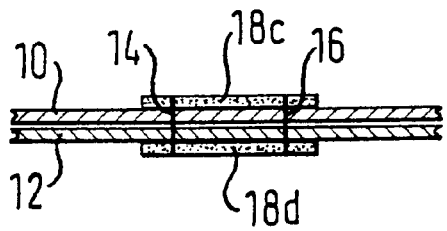
FIG. 3 shows an analogous sectional view of a further embodiment.
Figure 4:
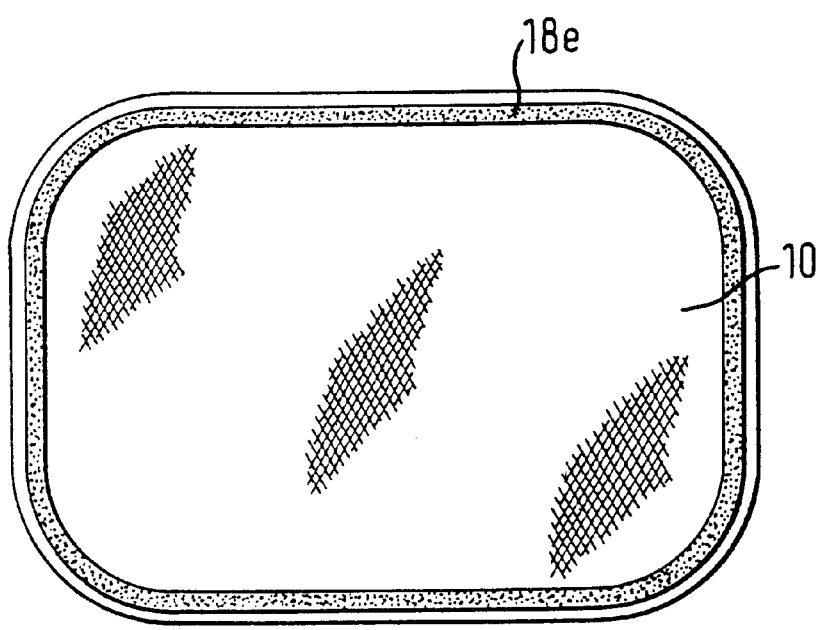
FIG. 4 shows a diagrammatic top view of a fabric piece for the manufacture of the gas bag.

In the embodiment shown in FIG. 3, two sealing material strips 18c, 18d are arranged lying opposite each other on the exterior on the fabric pieces 10, 12. Each of these strips 18c, 18d overlaps an area between the seams 14, 16 and extends laterally beyond the The sealing material strip can be applied as a band and bonded to at least one of the fabric pieces. However, the embodiment shown in FIG. 4 is particularly advantageous, in which a sealing material strip 18e is applied in the area of the seam which is to be produced, i.e. in particular along the periphery of a fabric piece 10 by a printing method, in particular by serigraphy, in which a liquid or pasty substance is scraped on the fabric piece using a screen configured in correspondence to the shape of the seam to be sealed.

What is claimed is:

1. A gas bag for protecting a vehicle occupant, said gas bag comprising at least two pieces of fabric and at least one seam defined by at least one thread connecting portions of said pieces of fabric, said pieces of fabric defining a volume for receiving gas, said pieces of fabric having facing surfaces, wherein at least one narrow sealing material strip extends along said seam and seals said seam from leakage of gas from between said pieces of fabric through said seam, said sealing material strip having opposite main surfaces each having a total area, each of said total areas of said main surfaces respectively engaging said facing surfaces of said pieces of fabric which are connected by the seam, said sealing material strip further having edge surfaces interconnecting said main surfaces, one of said edge surfaces encircling said volume and partially defining said volume, said sealing material strip further being free of any interconnection extending between opposed portions of said one of said edge surfaces of said sealing material strip.

2. The gas bag according to claim 1 wherein said sealing material strip extends laterally beyond said seam.

3. The gas bag according to claim 2 wherein said seam consists of at least two parallel seam lines and each of said seam lines is sealed by a sealing material strip.

4. The gas bag according to claim 3 wherein a space substantially free of said sealing material strip is provided between said seam lines.

5. The gas bag according to claim 1 wherein said sealing material strip is formed from a substantially gas-tight material layer.

6. The gas bag according to claim 1 wherein said sealing material strip is formed as a substantially gas-tight band which is bonded to at least one of said pieces of fabric.

7. The gas bag according to claim 1 wherein said sealing material strip is formed from a liquid or pasty material.

8. The gas bag according to claim 1 wherein said sealing material strip is formed from a substance based on silicate.

9. The gas bag according to claim 1 wherein said sealing material strip is formed from a substance based on synthetic polymer.

10. The gas bag according to claim 1 wherein said sealing material strip has a rigidity lower than that of said pieces of fabric.

11. A gas bag for protecting a vehicle occupant, said gas bag comprising at least two pieces of fabric and at least one seam defined by at least one thread connecting portions of said pieces of fabric, said pieces of fabric defining a volume for receiving gas, said pieces of fabric having facing surfaces, wherein at least one sealing material strip extends along said seam and seals said seam from leakage of gas from between said pieces of fabric, said sealing material strip being arranged on said facing surfaces of said pieces of fabric which are connected by said seam, a space substantially free of said sealing material strip being provided between said seam.

* * * * *